(12) United States Patent
Kirkeby

(10) Patent No.: US 6,721,803 B1
(45) Date of Patent: Apr. 13, 2004

(54) METHOD, SYSTEM AND PROGRAM FOR USING APPLICATION PROGRAMS IN MULTIPLE COMPUTERS TO RENDER ATTACHMENTS FOR A FAX JOB

(75) Inventor: Kevin Wayne Kirkeby, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,520

(22) Filed: Mar. 23, 2000

(51) Int. Cl.[7] ................................................ G06F 15/16
(52) U.S. Cl. ........................ 709/246; 709/201; 709/239
(58) Field of Search ................................ 709/206, 246, 709/105, 223, 201, 239; 358/442; 379/88.14

(56) References Cited

U.S. PATENT DOCUMENTS

| | | | |
|---|---|---|---|
| 4,902,881 A | | 2/1990 | Janku |
| 6,405,244 B1 | * | 6/2002 | Bando et al. ................ 709/206 |
| 6,411,685 B1 | * | 6/2002 | O'Neal ...................... 379/88.14 |
| 6,417,933 B1 | * | 7/2002 | Szurkowski ................ 358/442 |
| 6,421,707 B1 | * | 7/2002 | Miller et al. ................ 709/206 |

OTHER PUBLICATIONS

U.S. patent application Ser. No. 09/533,520, filed Mar. 23, 2000, entitled "Method, System, and Program for Using Application Programs in Multiple Computers to Render Attachments for a Fax Job".

U.S. patent application Ser. No. 09/533,147, filed Mar. 23, 2000, entitled "Method, System, and Program for Transmitting Facsimiles in a Network Environment where Multiple Fax Servers Use a Common Rendering Machine".

* cited by examiner

Primary Examiner—Le Hien Luu
(74) Attorney, Agent, or Firm—Konrad Raynes & Victor, LLP

(57) ABSTRACT

Disclosed is a system, method, and program for processing a message in a network computing system including a facsimile transmission comprised of a recipient contact address, e.g., phone number, e-mail address, etc., and one or more attached files. Facsimile transmissions are managed as fax jobs in a fax management system. For each attachment file in the fax job, the fax management system determines a network address of a computer including an application program capable of converting the attachment file to at least one image in a file format. Different computers at different network addresses are capable of converting different attachment file types to at least one image in the file format. The fax management system transmits the attachment file to the computer at the determined network address and the computer receiving the attachment file executes one application program to convert the attachment file to at least one image in a file format. After all the attachment files are converted to at least one image in the file format, the message is sent to a communication port for transmittal to the recipient contact address.

36 Claims, 6 Drawing Sheets

METHOD, SYSTEM AND PROGRAM FOR USING APPLICATION PROGRAMS IN MULTIPLE COMPUTERS TO RENDER ATTACHMENTS FOR A FAX JOB

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Transmitting Facsimiles in a Network Environment Where Multiple Fax Servers Use a Common Rendering Machine," by Kevin W. Kirkeby, having Application number 09/533,147 now pending; and "Method, System, And Program For Transmitting Facsimiles in a Network Environment," by Kevin W. Kirkeby, having Application number 09/533,498 now pending.

BACKGROUND OF THE INVENTION

1. Field of the Invention

The present invention relates to a method, system, and program for using application programs in multiple computers to render attachments for a fax job.

2. Description of the Related Art

In network computing systems, users at client computers may send and receive facsimiles through a shared system to centrally manage fax resources for network users. One prior art implementation of a network facsimile system uses one or more fax servers that are dedicated to receiving, rendering, transmitting, and otherwise managing facsimile jobs from network users. The dedicated fax servers have modem ports to directly transmit the fax message as well as perform all fax management related operations. One disadvantage of using server class machines as the fax server is the substantial cost of server machines. Another disadvantage is that such fax servers would be limited to rendering fax documents created in server based applications. However, network users most likely create fax documents with common application programs that are more likely to execute on personal computer oriented machines, such as word processors, graphics programs, spreadsheet programs, etc., that do not run efficiently or at all on the server machine. Thus, users could not use the fax server to transmit the type of documents they are most likely to have.

Another prior art network fax solution involves the use of a Windows NT server as a dedicated fax server that receives, renders, transmits and otherwise manages the facsimile message. The Windows NT fax server includes a modem port to transmit the facsimile as well as perform all fax management related operations. One disadvantage of this approach is that the Windows NT machine performs both fax rendering as well as fax transmission operations. Because both these operations are computationally intensive, in large network environments, many of these Windows NT machines must be provided to perform both rendering and fax transmission. A further disadvantage of this approach is that faxed documents are limited to those application programs that run on a Windows NT system. Such prior art systems cannot handle fax attachments created using application programs that run on other operating systems, such as UNIX, AIX, OS/400, etc.

Thus, there is a need in the art for an improved approach for allowing the facsimile transmission of documents created using different application programs on different operating system platforms.

SUMMARY OF THE PREFERRED EMBODIMENTS

To overcome the limitations in the prior art described above, preferred embodiments disclose a method, system, and program for processing a message in a network computing system including a facsimile transmission comprised of a recipient contact address, such as a phone number, e-mail address, etc., and one or more attached files. Facsimile transmissions are managed as fax jobs in a fax management system. For each attachment file in the fax job, the fax management system determines a network address of a computer including an application program capable of converting the attachment file to at least one image in a file format. Different computers at different network addresses are capable of converting different attachment file types to at least one image in the file format. The fax management system transmits the attachment file to the computer at the determined network address and the computer receiving the attachment file executes one application program to convert the attachment file to at least one image in a file format. After all the attachment files are converted to at least one image in the file format, the message is sent to a communication port for transmittal to the recipient contact address.

With the preferred embodiments, multiple network computers may be used to render the attachment files from a fax job into a common file format, such as the TIFF file format. This technique maximizes the number of types of documents that may be attached to a fax job, because network computers including different operating systems and application programs, i.e., with installed application programs and one operating system, may be used to render the job to the common fax file format. Further, rendering and converting document requires significant processor resources. Thus, the preferred embodiments reduce the processing load by allowing the attachment files to be distributed among multiple network computers to perform the rendering and conversion. In this way, the attachment files may be rendered concurrently if at least two different network computers are concurrently rendering different types of attachment files for the fax job. Still further, with the preferred embodiments, the fax management server may manage a greater number of faxes as the fax rendering and conversion operations are off-loaded from the fax server managing the fax jobs from different client computers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
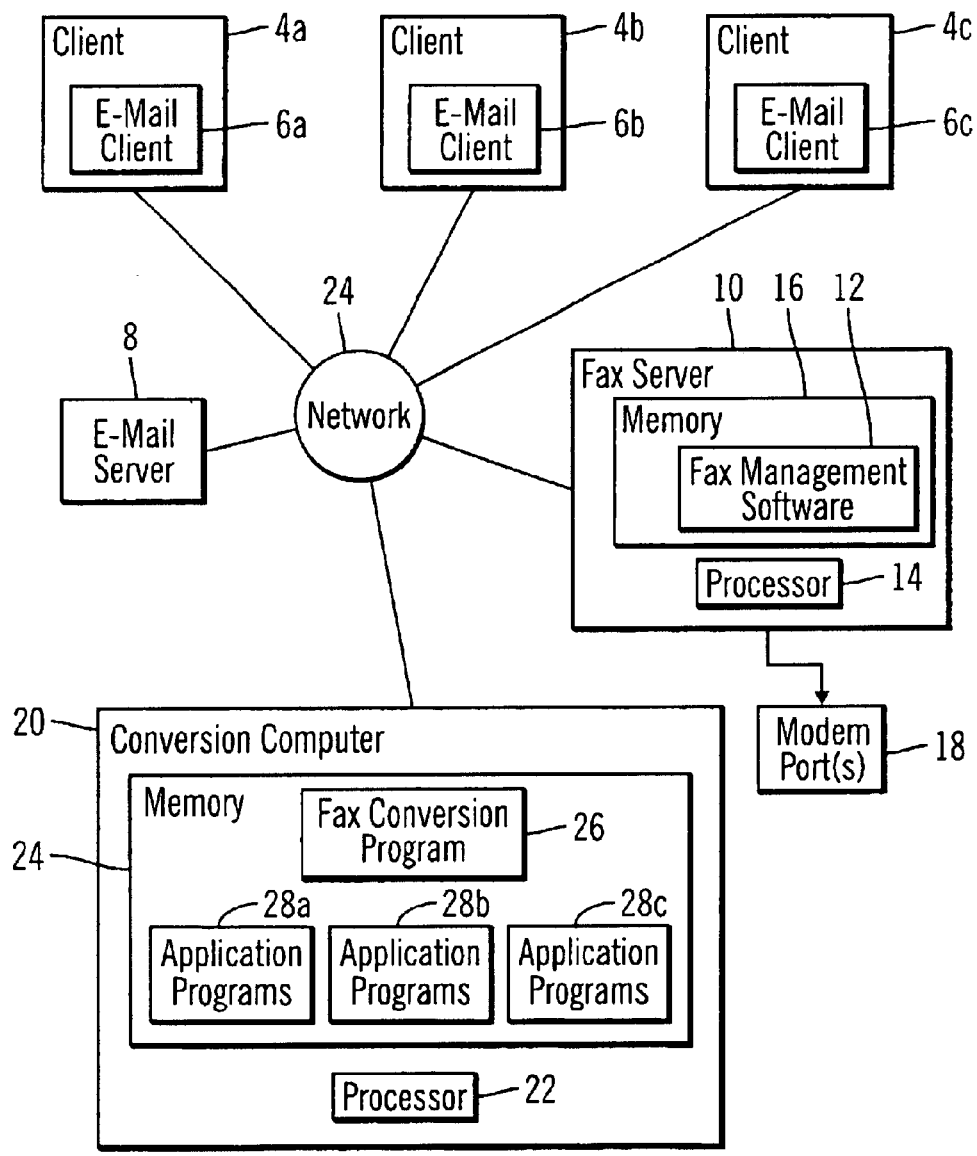
FIG. 1 is a block diagram illustrating a computing environment in which preferred embodiments of the present invention are implemented.

FIG. 1 illustrates a computing environment in which preferred embodiments are implemented. Client computers 4a, b, c, include e-mail client programs 6a, b, c, such as the Lotus Notes network client software. The client computers 4a, b, c could assemble e-mail messages which would be initially routed to an e-mail server 8, which may comprise any network server known in the art including server software for network messaging and routing e-mail messages from clients, such as the Lotus Domino server, Microsoft BackOffice Exchange Server, etc.** Those e-mails that are intended for facsimile transmission, referred to herein as "fax e-mails", are routed to a fax server 10 that includes fax management software 12. The fax server 10 is preferably a server class machine, such as the IBM AS/400. The fax server 10 includes one or more server class processors 14, memory 16, and server software (not shown), such as the Lotus Domino software. The processor 14 includes a central processing unit (CPU), which executes instructions to control the operations of the entire fax server 10. The memory 16 may comprise volatile memory and portions of non-volatile storage, where programs such as the fax management software 12 may be swapped between such volatile and non-volatile portions of memory 16. The fax server 10 fax management software 12 is capable of managing multiple facsimile transmissions transmitted for numerous network clients 4a, b, c. The fax server 10 would have access to one or more modem ports 18 capable of facsimile transmission.

The fax server 10 would transmit any attachments and message text in the fax e-mail message to a conversion computer 20. In preferred embodiments, the conversion computer 20 is a personal computer class machine having a personal computer class processor 22 and memory 24, which may comprise both volatile memory and non-volatile storage. Programs may be swapped between such volatile and non-volatile portions of memory 24. The processor 22 includes one or more central processing unit (CPU), which executes instructions to control the operations of the entire conversion computer 20. The conversion computer 20 further includes a fax conversion program 26. To convert attachments created using different software programs, e.g., word processors, spreadsheets, database, etc., the conversion computer 20 would include application programs 28a, b, c capable of opening and viewing the content of attachments from different application programs. The fax conversion program 26 would determine the application programs 28a, b, c needed to view attachments in the fax e-mail and then launch those determined application programs 28a, b, c to convert the attachments to a common format, such as the TIFF file format.

In preferred embodiments, the fax server 10 is a server class machine, such as the AS/400, including a server class operating system, such as OS/400, that is capable of multitasking operations from numerous clients 4a, b, c in order to concurrently manage numerous facsimile transmissions for the clients. Because the conversion computer 20 is dedicated to converting fax e-mail attachments to images in a TIFF file format, the conversion computer 20 need not be as powerful, and hence expensive, as the fax server 10. However, the conversion computer 20 could be used to perform non-fax related operations. Thus, in preferred embodiments, the conversion computer 20 comprises a personal computer with a personal computer operating system, such as Windows NT. However, alternative personal computer operating systems may be used, such as Windows 95/98/2000, IBM OS/2, Linux, etc. Another benefit of using a personal computer system for the conversion computer 20 is that not only are such systems less expensive than server class machines, but such systems are typically more suited for handling the fonts and graphics required for the conversion process than server machines. The personal computer and personal computer oriented operating systems are designed to handle the graphics requirements of common application programs 28a, b, c that will typically be used to create the attachments to the fax e-mail that needs to be converted to a common file format (TIFF) for facsimile transmission.

In alternative embodiments, the conversion computer 20 may be implemented in an expansion card that is plugged into an expansion slot of the fax server 10, such as the IBM Integrated Netfinity Server.** The IBM Integrated Netfinity Server card includes an Intel processor and PC memory, runs Windows NT and is capable of fitting into a PCI or SPD slot in the AS/400 server.

The different components of the network 4a, b, c, 8, 10, and 20 communicate over a network 24 comprised of any network technology known in the art.

Figure 2:
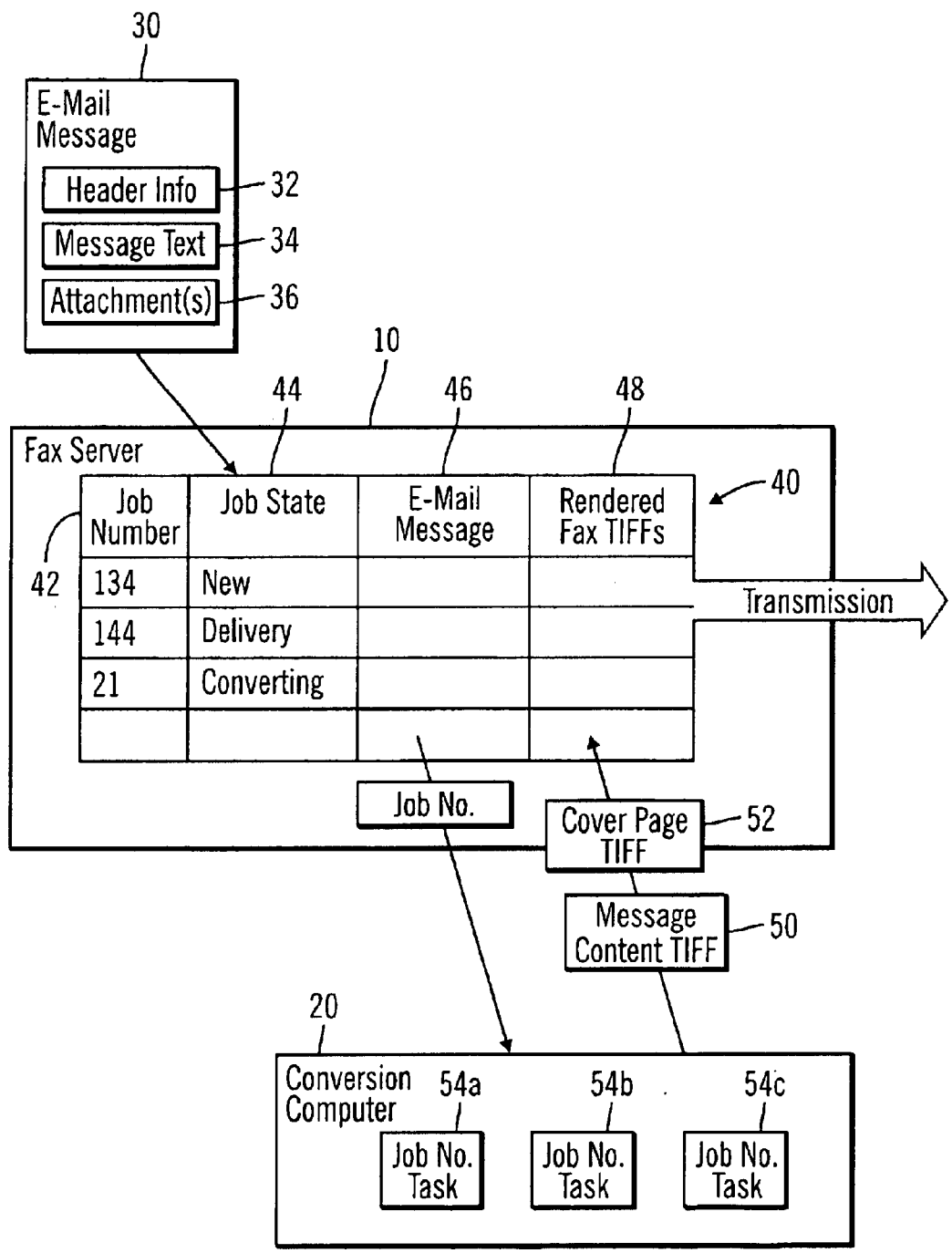
FIG. 2 illustrates a workflow diagram of processing an e-mail to fax in accordance with preferred embodiments of the present invention.

FIG. 2 illustrates a workflow diagram of how a fax e-mail 30 is processed throughout the preferred embodiment fax processing system. The fax e-mail 30 includes a header 32 specifying a recipient, the sender, and a subject line, message text 34 which is the e-mail message and is preferably in a text format, such as the Rich Text Format (RTF), ASCII, etc., and one or more attachments 36, which may have been created with different application programs (e.g., word processor, spreadsheet program, graphics programs, database programs, etc.). The fax e-mail 30, including the header info 32 and message text 34, may alternatively include additional fields of information or less information than shown. To manage the flow of a fax email 30, the fax management software 12 assigns the fax e-mail (fax job), a unique job number, which is used to uniquely identify the fax job as it proceeds through the workflow.

The fax management software 12 maintains a job table 40, which is used to control the workflow of the fax e-mail job. The job table 40 may comprise a database table or any other data structure known in the art. Still further, the table 40 may include more, less or different fields than shown in FIG. 2. The job table 40 includes as a key column the unique job number field 42 of the job; a job state field 44 indicating the current state of the job in the fax workflow; a message field 46 including all the components 32, 34, 36 of the e-mail message 30; and a rendered fax TIFF field 48 including TIFFs files rendered at the conversion computer 20. Thus, the job table 40 provides the core information needed to control the fax workflow. Alternatively, certain of the fields in the job table 40 may be maintained at alternative locations. For instance, the e-mail message field 46 and rendered fax TIFF field 48 may include pointers to storage or memory locations where the actual data, i.e., components 32, 34, and 36 of the e-mail message 30 and rendered TIFF files 50 and 52, respectively, are maintained, instead of the actual files and data.

The job table may include the following states:

New state: the state when the job number is first generated and a fax job entry is created in the job table 40.

Converting state: the state after the job number of a fax job record having the new state is sent to the conversion computer.

Delivery state: the state after the fax management software 12 receives from the conversion computer 20 message text 34, attachment files 36, and any cover page converted into one or more TIFF files.

Transmitting state: the state after the fax management software 12 sends the rendered TIFF files to the modem port 18.

Transmission Status states: these are states following the modem port's 18 transmission, and may indicate completed, retrying, failure, etc.

In alternative embodiments, fewer or more states may be used for the workflow or different naming conventions may be used for the states.

In preferred embodiments, the conversion computer 20 receives the job number and then accesses the job table 40 to obtain the header 32, message text 34 and any attachment files 36 to render into a message content TIFF 50. Using the header info 32, the fax conversion program 26 would access, if available, a separate cover page form for the sender from a cover page database, typically maintained at a server (not shown) elsewhere in the network 24. If there is no cover page for the sender in the cover page database or the sender has not requested the use of a cover page, then the fax would be rendered without a cover page. If a cover page form is provided, the conversion program 26 would render the accessed cover page into a cover page TIFF 52. The conversion computer 20 would send the rendered message content TIFF 50 and a cover page TIFF 52 to the fax server 10. The fax management software 12 would insert the rendered TIFF files 50 and 52 in the rendered fax TIFF field 48 to await the transmission mode.

In preferred embodiments, the message content TIFF 50 includes a first page that includes the e-mail window view, including all the header info 32, message text 34, and graphical representations (e.g., icons) of attachments 36 as is commonly displayed in an e-mail message. Following the e-mail view would be the renderings of any attachments 36.

In preferred embodiments, a separate task or thread is spawned in the conversion computer 20 to process each fax job received from the fax server 10. In this way, the conversion computer 20 may concurrently process each received fax number in separate job number tasks 54a, b, c, as shown in FIG. 2, wherein the components of each job are sequentially processed in each task.

In preferred embodiments, the tasks 54a, b, c execute as separate threads under control of the fax conversion program 26. In this way, the fax job conversion operations are multi-tasked across fax jobs. Still further, multiple threads may be spawned under the fax conversion program 26 to concurrently render different attachments in the same fax job.

Using An Application Mapper Database to Render Fax Attachments

Figure 3:
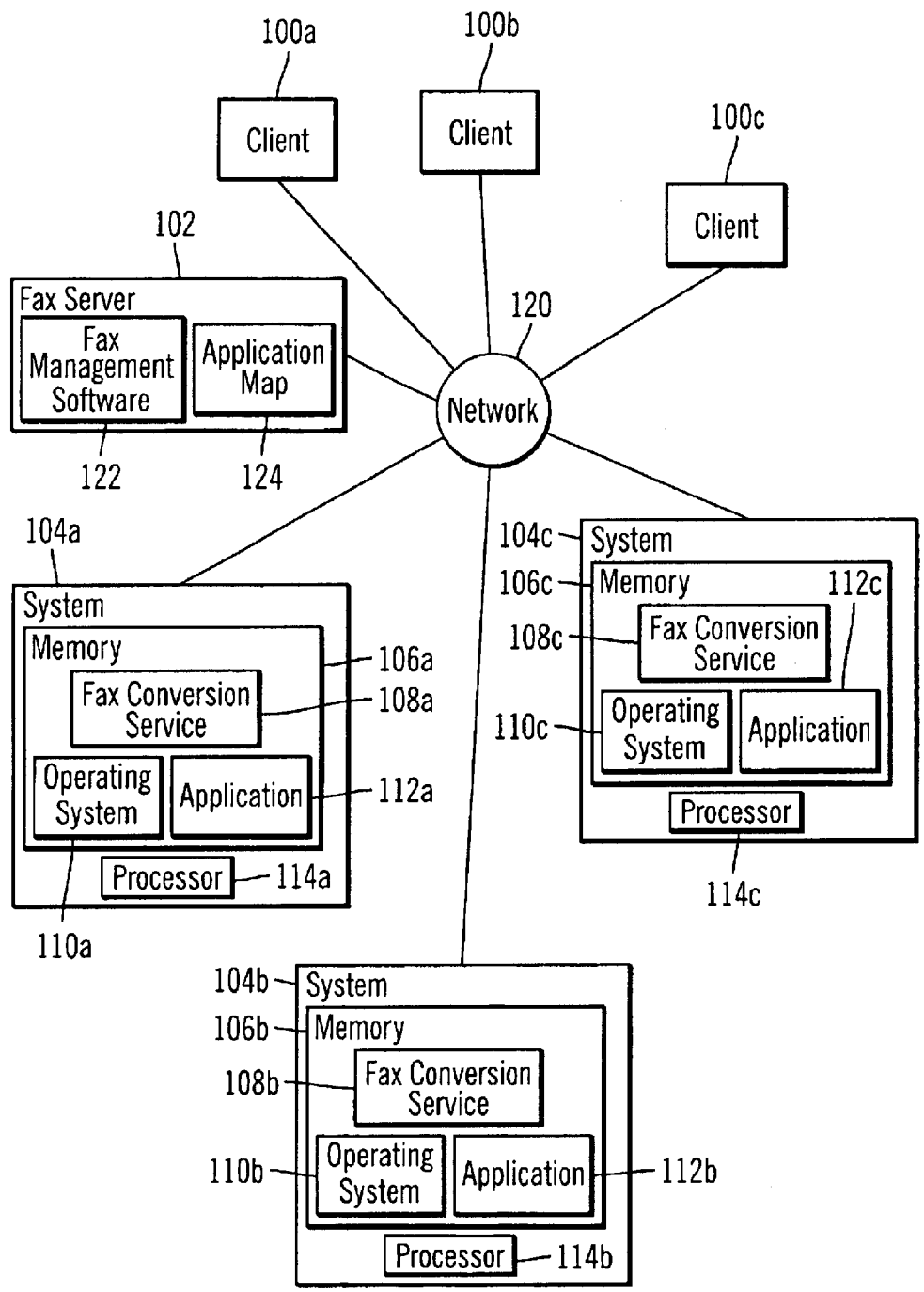
FIG. 3 illustrates a block diagram of an alternative computing environment in which preferred embodiments of the present invention are implemented.

FIG. 3 illustrates a further embodiment where clients 100a, b, c, fax server 102, and network computer systems 104a, b, c communicate over network 120. The fax server 102 would include the architecture and fax management software 122 described with respect to FIG. 1. Computer systems 104a, b, c, each include memory 106a, b, c, which may comprise both volatile and non-volatile components. Processors 114a, b, c may comprise any CPU processor type known in the art. The processors 114a, b, c would load and execute in memory 106a, b, c an operating system 100a, b, c, at least one application program 112a, b, c, and a fax conversion service 108a, b, c, respectively. The operating systems 100a, b, c may be comprised of different operating systems, e.g., UNIX, AIX, OS/400, Windows NT, Windows 95/98/2000, Linux, etc. In preferred embodiments, the application programs 112a, b, c are intended to be implemented on their respective operating system 110a, b, c, and are capable of producing output and rendering such output into a TIFF image/file. The number of computer systems 104a, b, c in the network 120 that are capable of rendering attachment files may be different than shown in FIG. 3. Further, the computer systems 104a, b, c performing rendering operations may perform non-fax related computation operations.

Figure 4:
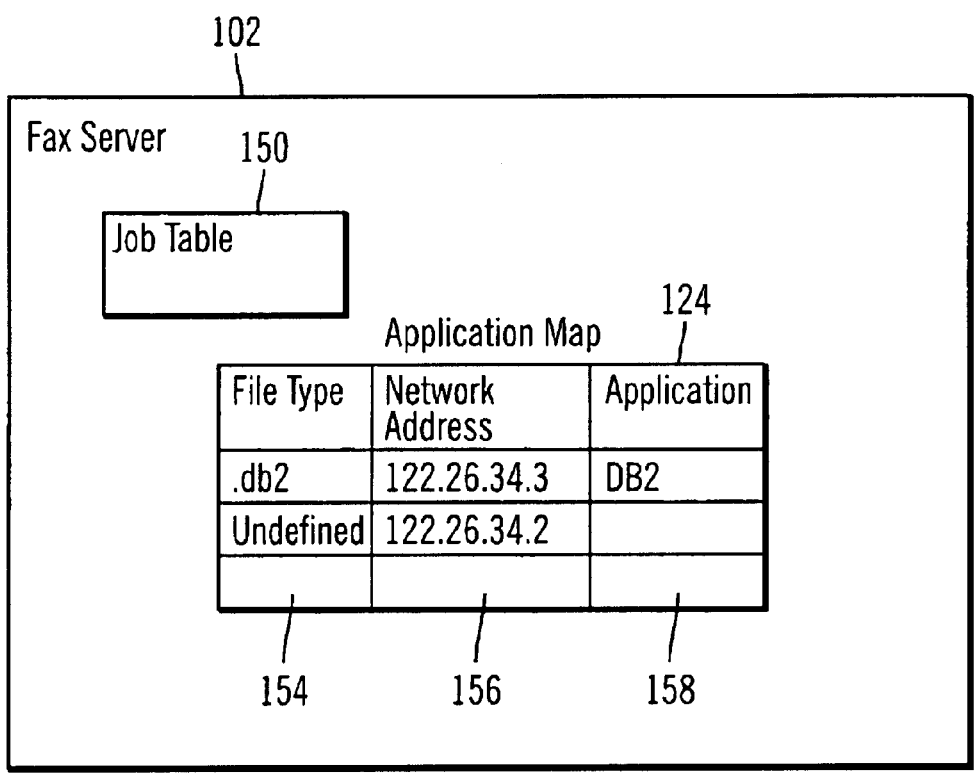
FIG. 4 illustrates an example of the tables maintained in the fax server to manage the flow of attachment files to network computers in accordance with preferred embodiments of the present invention.

In preferred embodiments, the fax management software 122 maintains an application map 124 in the memory that has entries associating a file type to a computer system 104a, b, c in the network and an application 112a, b, c must be installed in such computer system 104a, b, c to handle the file having the file type indicated in the file type field. FIG. 4 illustrates an example of the application map 124 maintained in the fax server 102 memory. In preferred embodiments, the fax server 102 memory includes a job table 150, such as the job table 40 shown in FIG. 2 for managing the workflow of fax jobs. The application map 124 includes a file type field 154, a network address field 156, and an application field 158. The file type field 154 indicates a file type extension that is usually attached at the end of the file name. The network address field 156 includes the network address of a computer system 104a, b, c in the network 120 that includes an application program 112a, b, cidentified in the application field 158 that is capable of opening a file having the file type indicated in the file type field 154 and rendering the content of the file to a TIFF image. Both the fax management software 122 and job table 150 are instances of the same fax management software 12 and job table 40 described with respect to FIGS. 1 and 2, respectively.

The fax server 102, when determining how to render attachments 36 to a fax e-mail, would use the application map 124 to determine the network computer system 104a, b, c that includes the application 112a, b, c capable of rendering the attachment file based on its file type. The fax server 102 would then send the particular attachment file to the network computer 104a, b, c identified in the network address field 156 for the attachment file type. In this way, all the computers in the network 120 may be used to perform conversion operations. Each network computer 104a, b, c which is capable of receiving and rendering for the fax server 102, would include the fax conversion service 108a, b, c program that provides the code to interface with the fax management software 122 to perform the rendering operations.

Figure 5:
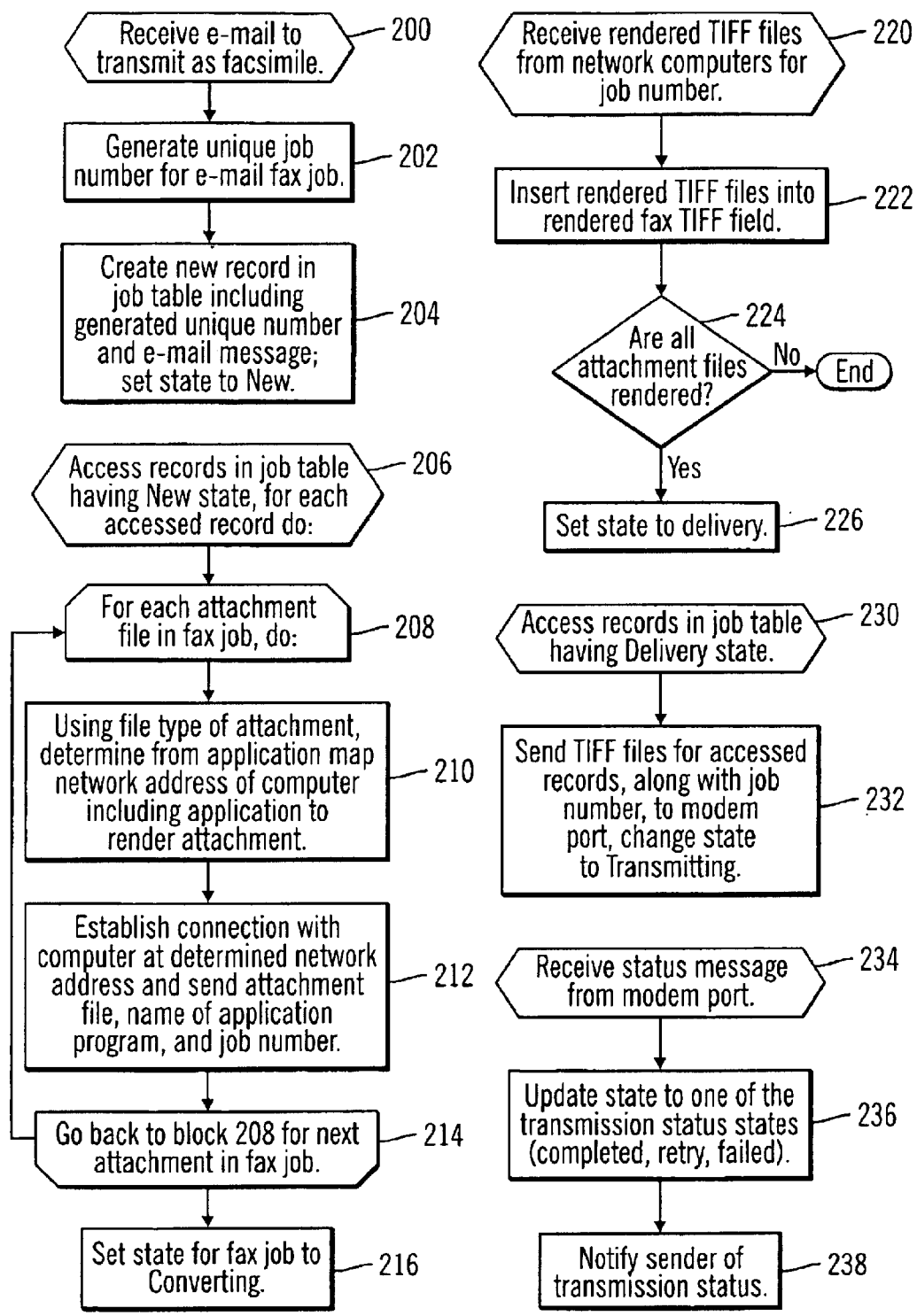
FIG. 5 illustrates logic implemented in the fax server to manage fax jobs in accordance with preferred embodiments of the present invention.

FIG. 5 illustrates logic implemented in the fax management software 122 to process the workflow of e-mail fax jobs from multiple clients 100a, b, c. At block 200, the fax management software 122 receives a fax e-mail message 30 from one of the clients 4a, b, c. The fax management software 122 would then generate (at block 202) a unique job number for the e-mail fax job and create (at block 204) a new record in the job table 150 to include the generated unique number in the job number field 42 and the components 32, 34, and 36 of the received fax e-mail message 30 in the e-mail message field 46. The job state 44 for the new record is set to "New."

At block 206, the fax management software 122 would access records in the job table 150 having the "New" state. For each accessed record in the job table 150 for a different e-mail fax job, the fax management software 122 performs the operations at blocks 208–214. For each attachment file in the fax job, steps 210 to 214 are performed. At block 210, the fax management software 122 finds an entry in the application map 124 that has a file type matching the file type of the attachment file, as identified by the file extension portion of the file attachment name, and determines in this entry the network address of the computer including, i.e., installed with, the application program identified in field 158 that can render the attachment file into a TIFF file. The fax management software 122 then establishes (at block 212) a connection with the computer at the network address and sends the attachment file, job number, and name of application to render the attachment file. After sending all attachment files to one or more network computers 104a, b, c, the state for the fax job having all its attachments sent out is set (at block 216) to "Converting."

At block 220, the fax management software 122 receives TIFF files for a job number from one or more of the network computers 104a, b, c and then inserts (at block 222) the rendered TIFF file(s) into the rendered fax TIFF field 48 of the record for the job number. After all the rendered TIFFs of the attachment files 36 are inserted in the field 48 (at block 224), including any rendered cover page and/or message content, the state for the record of the fully rendered fax job is set (at block 226) to "Delivery". The fax management software 122 may create a cover page TIFF 52 based on cover page information for the sender maintained in a separate coverage page database and from the header info 32.

The fax management software 122 may also create a message content TIFF 50 based on the message text 34 and header info. Alternatively, the fax management software 122 may have one of the network computers 104a, b, c render TIFF files for a fax cover page based on the header info 32 and message text 34. In this regard, the workflow where multiple network computers 104a, b, c are involved in rendering TIFF files differs from the workflow described with respect to FIG. 2 where only one conversion computer 20 (FIG. 1) handles rendering operations for all attachments, message, etc. With the preferred embodiments, many network computers may be involved in the TIFF rendering, as opposed to a single conversion computer as in the embodiment of FIGS. 1 and 2.

In alternative embodiments, the fax management software 122 may send the network computer 104a, b, c a job number and the name of the attachment file to render, and the fax conversion service 108a, b, c would then use the job number and attachment file name to retrieve the specified attachment file from the job table 150.

At block 230, the fax management software 122 accesses records in the job table 150 having the "Delivery" state and sends (at block 232) the rendered TIFF files in the rendered fax TIFF field 48 to the modem port 18 and changes the state for such records to "Transmitting".

At block 234, the fax management software 122 receives a status message from the modem port 18 for a fax job number. The fax management software 122 then updates (at block 236) the state to a possible transmission state, e.g., completed, failed, retrying, etc., and then sends (at block 238) a message to the sender over the network 24 indicating the status of the transmission.

The operations beginning at blocks 200, 206, 220, 230, and 234 may be executed concurrently as separate tasks or threads, and operate asynchronously. Because, in preferred embodiments, the fax management software 122 is running in a server class machine, it is capable of multitasking. In preferred embodiments, the fax management software 122 may initiate the operations beginning at blocks 206 and 230 at periodic intervals or in response to the state being set to "New" (for block 206) and the state being set to "Delivery" (for block 230). However, alternative techniques may be used to trigger the operations described above and process the records in the job table 150.

Figure 6:
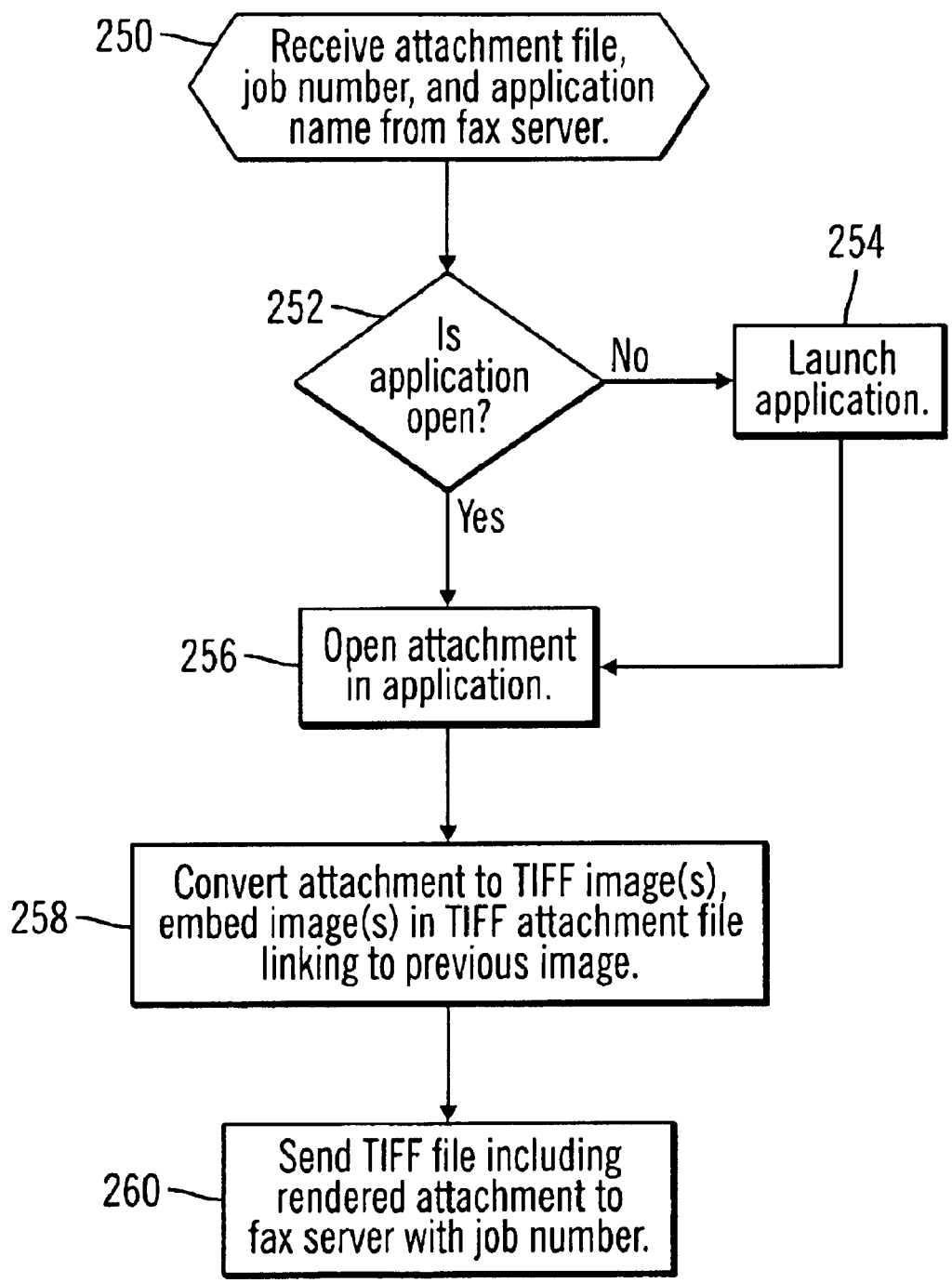
FIG. 6 illustrates logic implemented in a network computer to convert attachments to a TIFF file in accordance with preferred embodiments of the present invention.

FIG. 6 illustrates logic implemented in the fax conversion service 108a, b, c running in the network computers 104a, b, c to convert attachments for a fax job into TIFF files. Control begins at block 250 with the fax conversion service 108a, b or c receiving an attachment file, job number, and application program name to use to render the attachment file from the fax server 102. One network computer 104a, b or c may concurrently convert attachments for multiple fax job numbers. If (at block 252) the application program provided in the message from the fax server 102 is not already opened, then the application program 112a, b, c is launched (at block 254). When the application program 112a, b, c is open, the attached file is opened (at block 256) in the application program and the fax conversion service 108a, b, c then converts (at block 258) the opened file into one or more TIFF images. The rendered TIFF file is then sent back (at block 260) to the fax server 102 to complete the fax job.

In preferred embodiments, the application map 124 provides a default entry in the application map 124, shown as the undefined entry in FIG. 4, for attachment document types that do not match one of the values in the file type field 154. This avoids the need to define all possible file extension types. The attachments that do not have a file type specified in the application map 124 are then sent to the default computer at the network address for this default entry and rendered in one of the application programs at the default computer. This is further advantageous because if the default computer has numerous application programs, then the file types for such application programs need not be defined. Instead, those attachment file types would be sent to the default computer. For instance, the application map 124 may not include an entry for Windows application file types. Instead, the Windows computer would be used for the undefined file type. In this way, all the attachment files created using a Windows based application are not specified in the map 124 and are sent to the default or undefined entry. The Windows based system could then self-launch the application program in a manner known in the art to render the attachment file.

With the preferred embodiment arrangement, many of the network computers may be used to render and convert attachment files to TIFF files. In this way, the fax server is capable of processing attachments created using any available application on any available operating system platform because the fax server can use the different network computers, which may have different operating systems 110a, b, c and application programs 112a, b, c that may only execute on that particular platform. For instance, for those attachments created using personal computer word processing and graphics programs, the fax server 102 would use the application map 124 to send such attachments to a network personal computer including, i.e., having installed, those application programs. For application programs created using a scientific application program on a UNIX system, the fax server would use the application map to locate a network UNIX computer including such application program to render the file.

This arrangement is an improvement over prior art techniques that have a dedicated fax server, e.g., Windows NT machine, which can only handle fax attachments created using application programs that may execute on such dedicated fax server. With the preferred embodiments, any computer system in the network, even those having non-homogeneous operating systems, may be used to render TIFF files.

Another advantage is that conversion operations are distributed to the network computers most suited to handle the rendering job. Further by dispersing the rendering operations, the fax server has more processing capacity to manage a greater number of fax jobs as it does not have to render attachments into TIFF files, which is often a very processor intensive activity. Still further, to avoid overburdening one of the network computers with rendering operations, the application map may only map a single application program to one network computer, even if the network computer includes two application programs for rendering attachments. This improves throughput and the processing speed of rendering operations because multiple network computers may concurrently handle the rendering of the attachments for a single fax job, even if such network computers have the same operating system. This is substantially faster than having a single fax server perform all rendering, as well as fax management operations.

Still further, different computers in the network may be specified for the same application program in the application map 124. With this implementation, if multiple attachments are of the same file type, then each attachment could be sent to a different computer system to perform the rendering and conversion concurrently.

Alternatively, the network computers may receive attachment files from different fax jobs. In such case, separate threads could be spawned in the same network computer to concurrently process attachments of the same or different file type, using the same or different applications, for the same or different fax jobs. This would allow a single network computer to concurrently render and convert multiple attachment files.

Conclusion

This concludes the description of the preferred embodiments of the invention. The following describes some alternative embodiments for accomplishing the present invention.

The preferred embodiments may be implemented as a method, apparatus or signal bearing media using standard programming and/or engineering techniques to produce software, firmware, hardware, or any combination thereof. The programs defining the functions of the preferred embodiment can be delivered to a computer via a variety of signal-bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

In alternative embodiments, the application map 124 may not include the application name field 158. In such case, the network computer rendering the attachment file would perform the operation of associating the file type of the attachment with an application program, such as the self-launching feature found in Microsoft Windows operating systems, such as Windows NT/95/98/2000. In a yet further embodiment, the application name field 158 may not have any value for those systems, such as Windows NT/95/98 systems or any other system, that can internally perform the operation of associating a file with an application program and then self-launch the program. However, for those network computers that are not capable of associating and self-launching application programs for a file, the application name would be included in the application name field 158. In this way, the application name would be provided to those network computers that cannot perform the association of file to application program to inform such systems of the application program to use to render the attachment.

Preferred embodiments described certain of the fax processing operations performed in the fax server 10 and the conversion computer 20. However, certain of the operations described as performed with respect to the fax server 10 may be performed in the conversion computer 20 and vice versa.

Preferred embodiments described the use of a specific job table for managing the workflow of fax jobs. However, alternative tables and/or techniques for managing workflows known in the art may be applied to managing the fax job workflow.

In preferred embodiments, the e-mail server 8 was described as implemented in a separate machine from the fax server 10. In alternative embodiments, the e-mail, fax and other server related management and routing operations may be performed in a single server machine or across multiple server machines, depending on the processing needs of the network.

In preferred embodiments, the message from the client including the fax job was transmitted as an e-mail message. However, in alternative embodiments, alternative network messaging formats may be used to communicate fax jobs from the clients to the fax server.

In preferred embodiments, the cover page and attachments were converted to images in the TIFF file image format. However, in alternative embodiments, the cover page, message and/or attachments may be converted to an image in a different file format than TIFF that is compatible with the facsimile image transmissions capabilities. Moreover, all images in the fax job may be embedded in a single TIFF file or dispersed throughout any number of TIFF files.

In summary, preferred embodiments disclose a system, method, and program for processing a message in a network computing system including a facsimile transmission comprised of a recipient contact address, e.g., a phone number, e-mail address, etc., and one or more attached files. Facsimile transmissions are managed as fax jobs in a fax management system. For each attachment file in the fax job, the fax management system determines a network address of a computer including an application program capable of converting the attachment file to at least one image in a file format. Different computers at different network addresses are capable of converting different attachment file types to at least one image in the file format. The fax management system transmits the attachment file to the computer at the determined network address and the computer receiving the attachment file executes one application program to convert the attachment file to at least one image in a file format. After all the attachment files are converted to at least one image in the file format, the message is sent to a communication port for transmittal to the recipient contact address.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. ** Lotus Notes and Fax for Domino are trademarks of Lotus Development Corporation; Microsoft, Windows, NT, and BackOffice are registered trademarks of Microsoft Corporation; AS/400, OS/400, OS/2, and Netfinity are registered trademarks of IBM; Linux is a trademark of Linus Torvalds.

What is claimed is:

1. A method for processing a message in a network computing system including a facsimile transmission comprised of a recipient contact address and one or more attached files, comprising:

managing facsimile transmissions as fax jobs in a fax management system;

for each attachment file in a fax job, performing:

(i) determining, with the fax management system, a network address of a computer including an application program capable of converting the attachment file to at least one image in a file format, wherein different computers at different network addresses are capable of converting different attachment file types to at least one image in the file format, wherein the determination with the fax management system comprises processing a table having entries that each associate a file type with a network address of a computer including the application program capable of converting an attachment file of the associated file type and determining an entry having a file type that matches the file type of the attachment file, and wherein the table includes entries of computers that have different operating systems and different application programs;

(ii) transmitting, with the fax management system, the attachment file to the computer at the determined network address;

(iii) executing, with the computer receiving the attachment file, one application program to convert the attachment file to at least one image in a file format; and transferring all the converted attachment files in the message to a communication port for transmittal to the recipient contact address.

2. The method of claim 1, wherein for each attachment file in the fax job, further performing:

transferring, with the computer at the network address, the converted attachment file in the file format to the fax management system that sent the attachment file, wherein the fax management system transfers all the attachment files in the file format to the communication port.

3. The method of claim 1, wherein the table includes entries of computers having the same operating system and different application programs.

4. The method of claim 1, wherein the table includes entries of computers for the same operating system and same application program to allow for load balancing by distributing attachment files of the same file type to computers having the same operating system and application program.

5. The method of claim 1, wherein one attachment file in the fax job is sent to a first computer having a first operating system and another attachment file is sent to a second computer having a second operating system to render the attachment files to images in the file format.

6. The method of claim 1, wherein one attachment file in the fax job is sent to a first computer having a first application program to convert the received attachment file and another attachment file is sent to a second computer having a second application program to convert the received attachment file, wherein the first and second computers have the same operating system.

7. The method of claim 1, wherein multiple attachments from one fax job are sent to multiple computers at determined network addresses, and wherein the multiple computers concurrently convert the received attachment files to images in the file format.

8. The method of claim 1, wherein the determined computer at the network address can concurrently convert attachment files from different fax jobs into the file format.

9. The method of claim 1, wherein the facsimile transmission includes message content and a cover page that are converted to images in the file format for transmittal with the attachment files.

10. The method of claim 1 further comprising:

maintaining, with the fax management server, a job table including fax job records identified by job number; and changing, with the fax management servers, state fields in the fax job records to manage the workflow of the fax jobs between the fax management system and any computers to which attachment files were sent.

11. The method of claim 1, wherein the fax management system is implemented in a first computer, and wherein each attachment file is converted in at least one computer that is different from the first computer.

12. A method for processing a message in a network computing system including a facsimile transmission comprised of a recipient contact address and one or more attached files, comprising:

managing facsimile transmissions as fax jobs in a fax management system;

for each attachment file in a fax job, performing:

(i) determining, with the fax management system, a network address of a computer including an application program capable of converting the attachment file to at least one image in a file format, wherein different computers at different network addresses are capable of converting different attachment file types to at least one image in the file format, wherein the determination with the fax management system comprises processing a table having entries that each associate a file type with a network address of a computer including the application program capable of converting an attachment file of the associated file type and determining an entry having a file type that matches the file type of the attachment, wherein the table includes a default entry indicating a network address of one computer, and wherein the attachment file is sent to the network address identified in the default entry when there is no entry in the table specifying the file type of the attachment file;

(ii) transmitting, with the fax management system, the attachment file to the computer at the determined network address;

(iii) executing, with the computer receiving the attachment file, one application program to convert the attachment file to at least one image in a file format; and transferring all the converted attachment files in the message to a communication port for transmittal to the recipient contact address.

13. A system for processing a message in a network computing system including a facsimile transmission comprised of a recipient contact address and one or more attached files, comprising:

(a) a fax management system including a processor and a memory coupled to the processor;

(b) a plurality of computers, each including a processor and a memory coupled to the processor;

(c) at least one communication port in communication with the fax management system;

(d) fax management program logic residing in the memory of the fax management system, wherein the fax management program logic, when executed by the fax management processor performs:

(i) managing facsimile transmissions as fax jobs in a fax management system;

(ii) determining, for each attachment file in a fax job, a network address of one of the plurality of computers including an application program capable of converting the attachment file to at least one image in a file format, wherein different computers at different network addresses are capable of converting different attachment file types to at least one image in the file format, wherein the fax management program logic determines the network address of a computer including an application program capable of converting the attachment file by processing a table having entries that each associate a file type with a network address of a computer including the application program capable of converting an attachment file of the associated file type, and determining an entry having a file type that matches the file type of the attachment file, wherein the table includes entries of computers that have different operating systems and different application programs;

(iii) transmitting each attachment file to one of the computers at the determined network address; and (e) rendering program logic residing in the memory of the computers, wherein the rending program logic when executed by any of the computers performs executing one application program to convert the attachment file received from the fax management system to at least one image in a file format, wherein all the converted attachment files in the message are transferred to a communication port for transmittal to the recipient contact address.

14. The system of claim 13, wherein for each attachment file in the fax job, the rendering program logic further performs:

transferring the converted attachment file in the file format to the fax management system that sent the attachment file, wherein the fax management system transfers all the attachment files in the file format to the communication port.

15. The system of claim 13, wherein the table includes entries of computers having the same operating system and different application programs.

16. The system of claim 13, wherein the table includes entries of computers for the same operating system and same application program to allow for load balancing by distributing attachment files of the same file type to computers having the same operating system and application program.

17. The system of claim 13, wherein the fax management program logic further performs sending one attachment file in the fax job to a first computer having a first operating system and sending another attachment file to a second computer having a second operating system to render the attachment files to images in the file format.

18. The system of claim 13, wherein the fax management program logic further performs sending one attachment file in the fax job to a first computer having a first application program to convert the received attachment file and sending another attachment file is sent to a second computer having a second application program to convert the received attachment file, wherein the first and second computers have the same operating system.

19. The system of claim 13, wherein the fax management program logic further performs sending multiple attachments from one fax job to multiple computers at determined network addresses, and wherein the multiple computers concurrently convert the received attachment files to images in the file format.

20. The system of claim 13, wherein the rendering program logic is capable of concurrently converting attachment files from different fax jobs into the file format.

21. The system of claim 13, wherein the facsimile transmission includes message content and a cover page that are converted to images in the file format for transmittal with the attachment files.

22. The system of claim 13, wherein the fax management program logic further performs:

maintaining a job table including fax job records identified by job number; and changing state fields in the fax job records to manage the workflow of the fax jobs between the fax management system and any computers to which attachment files were sent.

23. The system of claim 13, wherein the fax management system is implemented in a first computer, and wherein each attachment file is converted in at least one computer that is different from the first computer.

24. A system for processing a message in a network computing system including a facsimile transmission comprised of a recipient contact address and one or more attached files, comprising:

(a) a fax management system including a processor and a memory coupled to the processor;

(b) a plurality of computers, each including a processor and a memory coupled to the processor;

(c) at least one communication port in communication with the fax management system;

(d) fax management program logic residing in the memory of the fax management system, wherein the fax management program logic, when executed by the fax management processor performs:

(i) managing facsimile transmissions as fax jobs in a fax management system;

(ii) determining, for each attachment file in a fax job, a network address of one of the plurality of computers including an application program capable of converting the attachment file to at least one image in a file format, wherein different computers at different network addresses are capable of converting different attachment file types to at least one image in the file format, wherein the fax management program logic determines the network address of a computer including an application program capable of converting the attachment file by processing a table having entries that each associate a file type with a network address of a computer including the application program capable of converting an attachment file of the associated file type, and determining an entry having a file type that matches the file type of the attachment file, and wherein the table includes a default entry indicating a network address of one computer, wherein the fax management system program logic further performs sending the attachment file to the network address identified in the default entry when there is no entry in the table specifying the file type of the attachment file;

(iii) transmitting each attachment file to one of the computers at the determined network address; and (e) rendering program logic residing in the memory of the computers, wherein the rending program logic when executed by any of the computers performs executing one application program to convert the attachment file received from the fax management system to at least one image in a file format, wherein all the converted attachment files in the message are transferred to a communication port for transmittal to the recipient contact address.

25. A signal-bearing medium containing a fax management program and a rendering program for processing a message in a network computing system including a facsimile transmission comprised of a recipient contact address and one or more attached files, wherein the fax management program is executed by a fax management system and the rendering program is executed by a plurality of computers, comprising:

wherein the fax management program causes the fax management system to perform:

(i) managing facsimile transmissions as fax jobs in a fax management system;

(ii) determining, for each attachment file in a fax job, a network address of one of the plurality of computers including an application program capable of converting the attachment file to at least one image in a file format, wherein different computers at different network addresses are capable of converting different attachment file types to at least one image in the file format, wherein the fax management program determines the network address by processing a table having entries that each associate a file type with a network address of a computer including the application program capable of converting an attachment file of the associated file type and determining an entry having a file type that matches the file type of the attachment file, and wherein the table includes entries of computers that have different operating systems and different application programs;

(iii) transmitting each attachment file to one of the computers at the determined network address; and wherein the rendering program causes the computers to perform executing one application program to convert the attachment file received from the fax management system to at least one image in a file format, wherein all the converted attachment files in the message are transferred to a communication port for transmittal to the recipient contact address.

26. The signal bearing medium of claim 25, wherein for each attachment file in the fax job, the rendering program further performs:

transferring the converted attachment file in the file format to the fax management system that sent the attachment file, wherein the fax management system transfers all the attachment files in the file format to the communication port.

27. The signal bearing medium of claim 25, wherein the table includes entries of computers having the same operating system and different application programs.

28. The signal bearing medium of claim 25, wherein the table includes entries of computers for the same operating system and same application program to allow for load balancing by distributing attachment files of the same file type to computers having the same operating system and application program.

29. The signal bearing medium of claim 25, wherein the fax management program, further performs sending one attachment file in the fax job to a first computer having a first operating system and sending another attachment file to a second computer having a second operating system to render the attachment files to images in the file format.

30. The signal bearing medium of claim 25, wherein the fax management program further performs sending one attachment file in the fax job to a first computer having a first application program to convert the received attachment file and sending another attachment file is sent to a second computer having a second application program to convert the received attachment file, wherein the first and second computers have the same operating system.

31. The signal bearing medium of claim 25, wherein the fax management program further performs sending multiple attachments from one fax job to multiple computers at determined network addresses, and wherein the multiple computers concurrently convert the received attachment files to images in the file format.

32. The signal bearing medium of claim 25, wherein the rendering program is capable of concurrently converting attachment files from different fax jobs into the file format.

33. The signal bearing medium of claim 25, wherein the facsimile transmission includes message content and a cover page that are converted to images in the file format for transmittal with the attachment files.

34. The signal bearing medium of claim 25, wherein the fax management program further performs:

maintaining a job table including fax job records identified by job number; and changing state fields in the fax job records to manage the workflow of the fax jobs between the fax management system and any computers to which attachment files were sent.

35. The signal-bearing medium of claim 25, wherein the fax management system is implemented in a first computer, and wherein each attachment file is converted in at least one computer that is different from the first computer.

36. A signal-bearing medium containing a fax management program and a rendering program for processing a message in a network computing system including a facsimile transmission comprised of a recipient contact address and one or more attached files, wherein the fax management program is executed by a fax management system and the rendering program is executed by a plurality of computers, comprising:

wherein the fax management program causes the fax management system to perform:

(i) managing facsimile transmissions as fax jobs in a fax management system;

(ii) determining, for each attachment file in a fax job, a network address of one of the plurality of computers including an application program capable of converting the attachment file to at least one image in a file format, wherein different computers at different network addresses are capable of converting different attachment file types to at least one image in the file format, wherein the fax management program determines the network address by processing a table having entries that each associate a file type with a network address of a computer including the application program capable of converting an attachment file of the associated file type and determining an entry having a file type that matches the file type of the attachment file, and wherein the table includes a default entry indicating a network address of one computer, wherein the fax management program further performs sending the attachment file to the network address identified in the default entry when there is no entry in the table specifying the file type of the attachment file;

(iii) transmitting each attachment file to one of the computers at the determined network address; and wherein the rendering program causes the computers to perform executing one application program to convert the attachment file received from the fax management system to at least one image in a file format, wherein all the converted attachment files in the message are transferred to a communication port for transmittal to the recipient contact address.

* * * * *